United States Patent [19]

Bushnell et al.

[11] 4,071,697

[45] Jan. 31, 1978

[54] INTERACTIVE VIDEO/TELEPHONE TRANSMISSION SYSTEM

[75] Inventors: Nolan K. Bushnell, Los Gatos; Joseph F. Keenan, San Jose, both of Calif.

[73] Assignee: Atari, Inc., Sunnyvale, Calif.

[21] Appl. No.: 724,013

[22] Filed: Oct. 18, 1976

[51] Int. Cl.² .......................................... H04M 11/00
[52] U.S. Cl. .................................. 179/2 TV; 179/2 R
[58] Field of Search ................. 358/85; 179/2 R, 2 A, 179/2 CA, 2 DP, 2 TV

[56] References Cited

U.S. PATENT DOCUMENTS

| 3,746,780 | 7/1973 | Stetten et al. | 358/85 |
| 3,752,904 | 8/1973 | Waterbury | 358/85 |
| 3,780,907 | 12/1973 | Colburn et al. | 179/2 A |

OTHER PUBLICATIONS

IBM Technical Disclosure Bulletin, vol. 10, No. 7, Dec. 1967, p. 904, "TV Buffer", W. K. French.

Primary Examiner—George G. Stellar
Attorney, Agent, or Firm—Flehr, Hohbach, Test, Albritton & Herbert

[57] ABSTRACT

An interactive purchasing system employs a station transmitting signals adapted to be received by a plurality of television receivers at a number of viewing stations via a given television channel. In one application, the signals represent information relating to associated merchandise in various stores. A viewer uses keyboard controls to scan the "pages" of advertising on a video display and to indicate a selected purchase. A telephone coupling arrangement provided at each viewing station is adapted to cooperate with a telephone in placing a call via the telephone selectively to one of a plurality of stores. Means are further provided at each viewing station for selecting merchandise to be purchased including means serving to operate a conventional telephone at the viewing station to call the particular stores related to the selected merchandise and to register a request to purchase the selected merchandise.

6 Claims, 3 Drawing Figures

INTERACTIVE VIDEO/TELEPHONE TRANSMISSION SYSTEM

BACKGROUND OF THE INVENTION

This invention pertains to an interactive transmission system and more particularly to an interactive transmission system of a type in which a general transmission of signals is provided in a manner adapted to be received by a plurality of television receivers at viewing stations while means at the viewing stations permits the viewer to respond to the information transmitted and also to register a telephoned report at an associated one of a plurality of locations, such as stores. This invention is particularly useful in providing an interactive purchasing system in which shopping can be conducted in a bi-directional manner based on the selection of merchandise displayed at a video viewing station and entry of a purchase order by telephone from the viewing station.

Heretofore interactive arrangments have been provided in which, for example, a subscriber can dial a given broadcasting station. The station will then select and address an appropriate predetermined program of information to be transmitted to the particular subscriber.

According to another arrangment a so-called "electronic newspaper" has been provided wherein there is a continuous broadcast of information and the customer can, at his viewing end, "flip" through the "pages" broadcast at a desired rate.

According to a further arrangement, the viewer can, using a decoder and key pad, select a page of text as desired. A decoder memory or shift register is employed to store the digitized pages being broadcast. At that point the pages are cycled at a rate on the order of 0.25 seconds per page.

As disclosed herein, a system is provided in which a unit can be attached to a commercial television receiver and simply coupled to a telephone to dial one of a number of telephone numbers and place a purchase order in response to selecting an item of merchandise at the viewing station. The dialed store provides an audio response via the telephone as well as a recordation of the purchase for the records of the store.

The called store identifies the calling party by means of a code transmitted as a preamble to the buying information. The code contains the credit card number and telephone number of the caller. The caller has a row of pre-set thumbwheel switches at his unit with this information. The computer at the called station is of a type which can perform a credit check on the caller by means of the credit card number. This number also gives the computer access to the name and billing address of the caller.

SUMMARY OF THE INVENTION AND OBJECTS

In general, an interactive transmission system is provided comprising a station transmitting a general transmission of signals adapted to be received via a given channel of television receivers disposed at viewing stations. Telephone coupling means are provided at each of the viewing stations and are adapted to cooperate with a telephone in placing a call via the telephone to one of a plurality of called stations. The signals generally transmitted include a plurality of information items, each carrying information respectively associated with a given one of the plurality of called stations. Further, means are provided for selecting an information item and registering a report related thereto at a called station associated therewith via the telephone.

In general, it is an object of the present invention to provide an improved interactive transmission system particularly adapted for purchasing items from stores by selection at a viewing station.

It is another object of the present invention to provide an improved viewing station for use in conjunction with a system of the kind described.

A further object of the invention is to provide an improved order-entry system with telephone response to the ordering party.

The foregoing and other objects of the invention will become more readily evident from the following detailed description of a preferred embodiment when considered in conjunction with the drawings.

DETAILED DESCRIPTION OF PREFERRED EMBODIMENT

Figure 1:
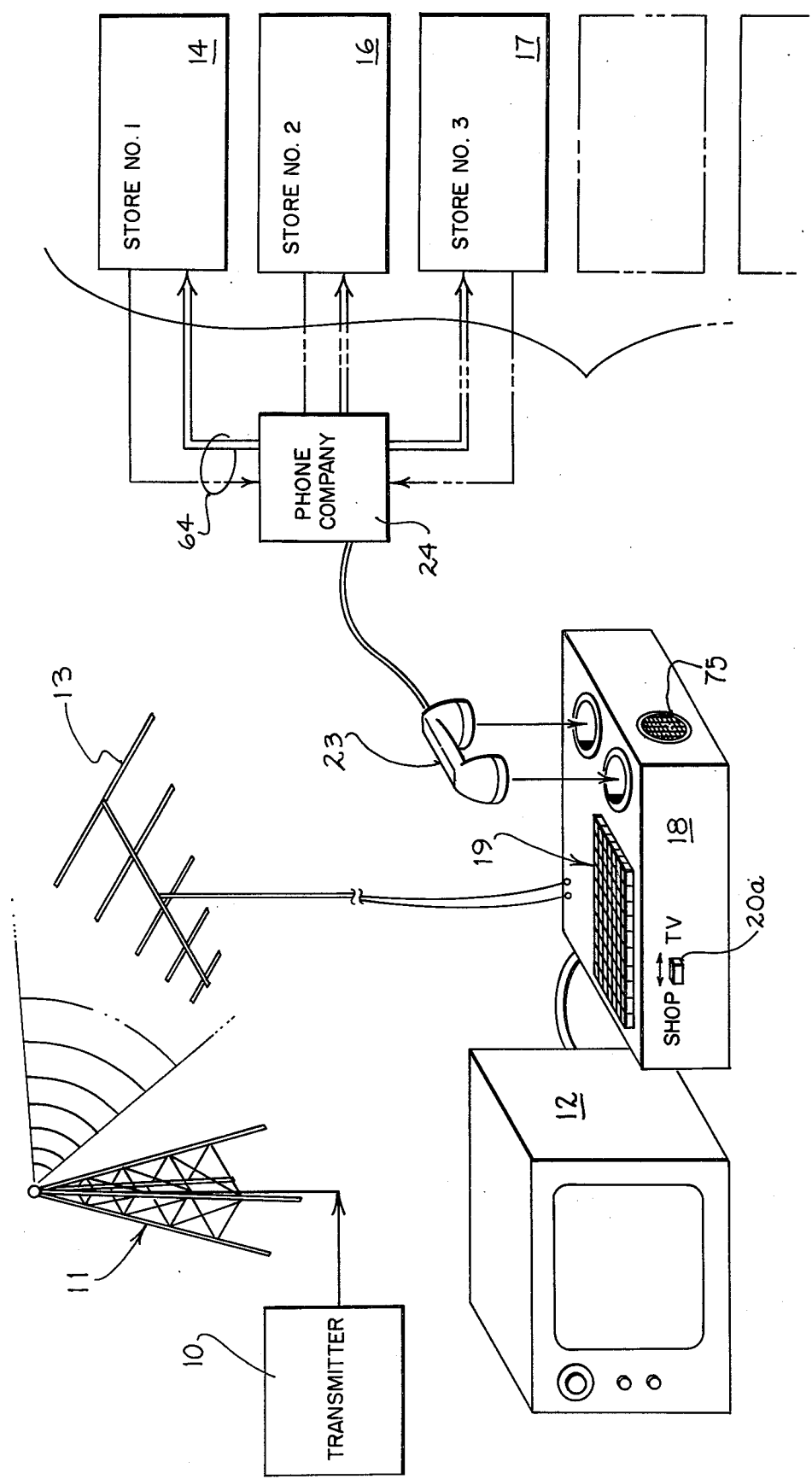
FIG. 1 shows a diagram representative of a system of the kind described, according to the invention.

While the present invention is not considered to be limited to a single application the construction shall be described hereafter in conjunction with a suitable application involving its use in purchasing merchandise from any one of a number of stores. Accordingly, as shown generally in FIG. 1 a transmitter station 10 broadcasts shopping information generally such as by the antenna 11 or by a coaxial cable, either of which is considered to provide a general transmission of signals adapted to be received by a plurality of television receivers such as the receiver 12 and its associated antenna 13. The information broadcast consists of groups of data each having an address portion and data portion pertaining to merchandise from each of the stores 14, 16, 17.

Thus, blocks of digital information are encoded in the RF signal. This digital information describes the character set so that when it is decoded, text may be recovered. Each block of digital information has a unique address.

As shown in FIG. 1, the receiving antenna 13 feeds signals through a controller 18 wherein the RF information is continuously modulated and decoded. From the decoded information, controller 18 recognizes the address of the blocks of information as they are received. The viewer selects which block he wants to see by means of a keyboard 19. The broadcast of the information is continuously repeated or "cycled" whereby after the viewer selected the block which he wants to see controller 18 awaits the proper block to arrive at antenna 13. When using the standard N.T.S.C. time base of U.S. broadcasts, there are 60 frames per second and the waiting period for any one of the blocks will be a relatively short time. The time can be further shortened by broadcasting multiple blocks per T.V. frame such as ten blocks per frame whereby the maximum waiting period for one of ten thousand blocks would be a maximum of 16.6 seconds and an average of 8.3 seconds.

A switch box 20 (FIG. 3) (controlled by the two position switch button 20a) is coupled by suitable known circuitry whereby when in one position it will allow the operator to selectively use the T.V. as a conventional broadcast T.V. receiver, in which case the signal from antenna 13 are routed directly to T.V. 12. In a second position of button 20a, the T.V. is used as a shopping terminal in which case the signal from antenna 13 are simply routed internally through the circuitry of controller 18 and RF signal generated in controller 18 are then fed to T.V. receiver 12.

Figure 3:
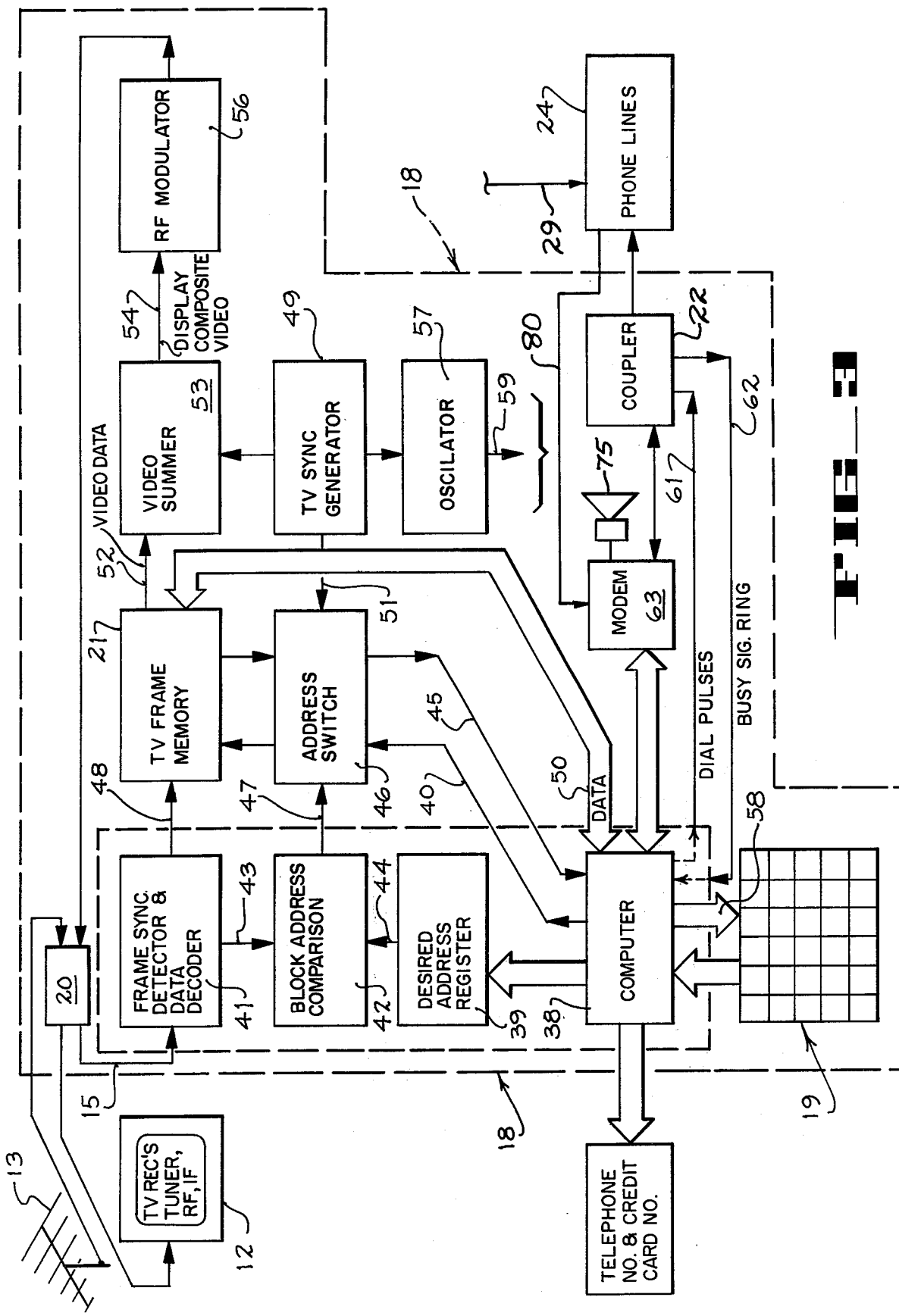
FIG. 3 shows a detailed block diagram of a consumer terminal, according to the invention.

As shown in FIG. 3, when the proper information block arrives via antenna 13 to input 15 entering controller 18 the information is loaded into a scan memory 21 described more fully below. The scan memory 21 continuously feeds the information into a T.V. receiver 12 after processing it into the proper video format so as to refresh T.V. 12.

If it is assumed that the various blocks to be selected are pages of a catalog with text and illustrations, the wait involved in processing is small since only a one-way T.V. channel is employed, and the display processing is straight forward. When the viewer sees an item that he wants he can indicate that he wants to but it by depressing the proper keys on keyboard 19.

Controller 18 as noted below then by known means generates telephone dialing signals to be fed to a telephone coupler 22. Coupler 22 can, for example, be of the acoustic type wherein a telephone hand set 23 can be inserted through openings formed in coupler 22 or the unit can be wired directly into the telephone lines via a jack. This method would make the placing of an order fully automatic. Thus when the dialing signals are generated by controller 18, the appropriate store will be dialed through the telephone company transmission lines 24 to enter a purchase order as described further below.

At this point computer 68 at the store (FIG. 2) will run a standard routine associated with the entry of such purchase order such as checking credit, checking inventory, etc. and finally authorizing the sale of the merchandise selected by the viewer. If the credit check etc. can be run immediately, the called computer 68 will respond to the caller immediately after the call is placed by means of line 70 (FIG. 2) to mux 67 and modem 66 via the phone line 31, coupler 28, and line 29 to the caller through speaker 75 (FIGS. 1 and 3) at the customer's station (FIG. 3).

If the information is delayed in processing, the computer confirms this as above and once the purchase has been authorized a voice synthesizer 26 generates an appropriate signal through a modulator/demodulator unit 27, to a telephone coupler 28 whereby a synthesized acknowledgement by voice can be returned to the viewer by an output lead 29 directed to the phone company lines 24. Dialing information generated along lead 31 serves to activate coupler 28 for transmitting the synthesized voice report to the viewer. In either case computer 68 will request some extra bit of identifications e.g. mother's maiden name, etc. This data can be sent to computer 68 via keyboard 19, etc. The use of the telephone line and answer back allows positive confirmation of the purchase order and permits the use of low cost standard telephone lines instead of expensive T.V. channels or conditioned phone lines.

Figure 2:
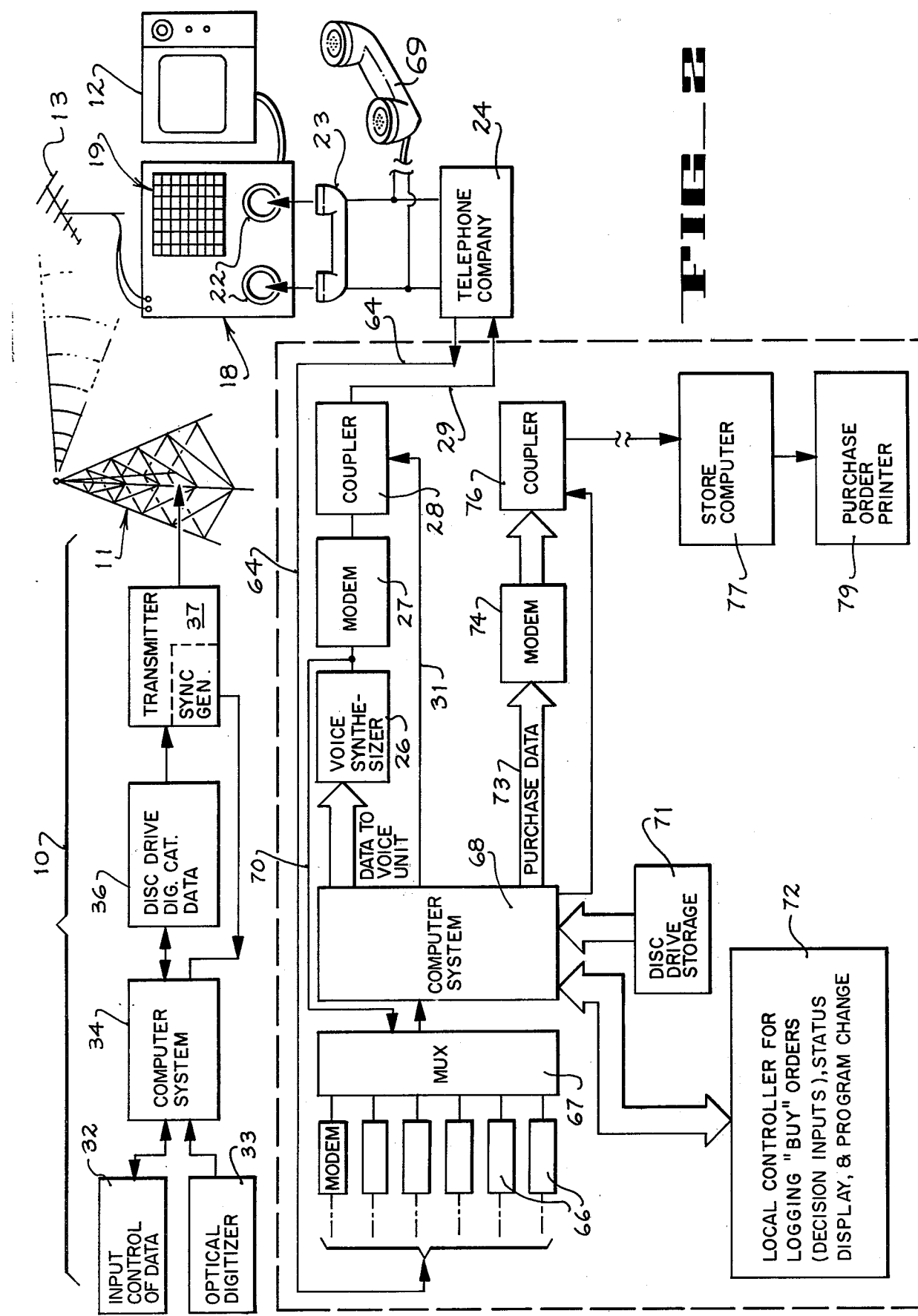
FIG. 2 shows a block diagram of a system of the kind described in greater detail, according to the invention.

FIG. 2 shows in greater detail the transmitter station 10 and the purchase order entry system as used by each of the stores. Transmitter station 10 includes a studio portion comprising an operator CRT terminal 32 for controlling the input of data to be broadcast.

For purposes of adding pictures to the general transmission, an optical digitizer unit 33 is coupled to the digitizing computer system 34. Means for digitizing analog signals for transmission via computer system 34 constitutes a known development and is not considered to be, per se, the invention disclosed herein. Computer system 34 is coupled to a disc drive storage 36, equivalent solid state or other unit, for storing a digital catalog of data. At this point the data may be read off the storage unit in-situ for use or more generally be transferred from the disc storage and stored and duplicated on video tape for general distribution to any number of broadcasting points. The output of storage 36 passes to a power transmitter unit 37, a portion of which regenerates a sync signal for maintaining computer system 34 synchronized with the remainder of the transmitter system 10, during the data recording phase.

Accordingly, the output transmitter unit 37 feeds to antenna 11 as above described (or to a cable transmission system) for providing a general transmission (in either case) of signals including encoded groups of data pertaining to information items each respectively associated with a given one of the several called stations, such as the stores.

Controller 18, as disclosed in more detail further below, employs keyboard 19 for selecting groups of data and information items from the video information appearing on the screen of receiver 12.

When the desired page or block is selected by depressing one or more keys of keyboard 19, an address associated with the item is entered into computer 38 and passed to an address register 39 for comparison with the coded addresses of items of information being received by antenna 13 and receiver 12. The input to receiver 12 includes digitally coded information associated with the items of information displayed on the screen thereof and this information is passed to the frame sync detector and data decoder circuitry 41 wherein the decoded addresses are continuously fed to a block address comparison circuit 42. Accordingly, when the address being entered by lead 43 compares to the desired address via lead 44 an output control signal for an address switch 46 appears on line 47.

Address switch 46 serves to switch the decoded information item or group of data into the T.V. frame memory 21 by lead 48.

Memory 21 is of known construction and is arranged whereby it can be cyclicly read out so as to continuously "refresh" the screen of receiver 12.

Thus, the video data is passed from memory 21 by a line 52 to video summer 53 for combining therewith sync pulses from sync generator 49 to provide a composite video display signal on line 54.

Composite video on line 54 is modulated by the RF modulator 56 and fed back to drive the input to receiver 12 via switch box 20.

Timing signals for the overall system are provided by oscillator 57 as represented by the output 59 thereof.

In short, upon making a selection by keyboard 19 as to merchandise to be purchased, dialing pulses are generated by controller 18 for a telephone coupler for purposes of calling the appropriate store advertising the particular merchandise being purchased. Thus, means for generating telephone dialing signals to be fed to a coupling means in response to selecting an associated group of data is provided primarily from computer 38 providing dialing pulses on line 60.

In one preferred embodiment, the telephone number of the actual store involved is encoded with the transmitted video data in a known location of T.V. frame memory 21. This data is accessed by computer 38 via address bus 40, control line 45 and data lines 50.

Thus, the called store identifies the calling party by means of a code transmitted as a pre-amble to the buying information. The code contains the credit card number and telephone number of the caller. The caller has a row of pre-set thumbwheel switches at his unit with this information. The computer at the called station is of a type which can perform a credit check on the caller by means of the credit card number. This number also gives the computer access to the name and billing address of the caller.

In another embodiment, the call will be placed to a known telephone number preprogrammed in computer 38 for a central clearing house which will route the call's information to the proper store. In this method of decoding, the identity of the particular store to be dialed is known by limiting advertising on any given "page" to a single store.

Thus, the page number itself can be used as the identification of the store to be called. In response to entering the "page" number via keyboard 19, computer 38 then generates dialing pulses associated with the central clearing house for the telephone associated with coupler 22 which operates via conventional phone lines 24. In the event that a busy signal occurs, with either method, the busy signal is picked up by a return line 62 to be fed into computer 38 for purposes of re-dialing coupler 22.

Once a telephone connection has been made between computer 38 and a selected store the coded output of computer 38 representing particular merchandise to be purchased is passed through a modulator/demodulator unit (modem) 63 and coupler 22 to phone lines 24. Audible acknowledgement of the order is heard at controller 18 from speaker 75 (FIG. 3) coupled to phone lines 24 by lead 80 and modulator/demodulator 63.

After controller 18 has dialed the appropriate number as designated by computer 38, the telephone 23 disposed in coupler 22 is coupled via lead 64 to an available one of the modulator/demodulator units 66 forming part of the input to multiplexing circuitry 67 for feeding into computer system 68 controlling operations of the system at the selected store.

For example, computer system 68 can be arranged by known means to provide data to be supplied to a voice synthesizer circuit 26 of known construction whereby an audible response can be supplied to telephone 23 disposed in coupler 22. By use of an extension phone 69 or speaker built into unit 18, the audio response confirming the purchase can be heard by the viewer.

In addition, a disc drive or equivalent data storage apparatus 71 serves to retain large volumes of information, such as credit ratings, prior balances, and the like with regard to the purchaser calling in on the system described. Further, a local controller 72 of suitable known construction serves to log the "buy" orders and other decision inputs, status display information, and program changes whereby computer 68 will be fed appropriately up-to-date information.

Once computer 68 has received an order to buy particular merchandise, it either processes it directly if it is the store's own computer. If it is the clearing housing computer, it forwards the data via line 73 and a modulator/demodulator unit 74 to a telephone coupler 76 connected to a conventional computer 77 used by the store. Computer 77 serves primarily as an inventory control and credit check device. Then if all conditions are appropriate for permitting purchase of the given merchandise a purchase order is printed by a conventional printer 79 under instructions from computer system 68. This order is printed to have a manual record of the transaction and will be done at the store computer and optionally if a clearing house is used at the clearing house and store computer.

While the foregoing example pertains primarily to a purchasing application involving the entry of a "buy" order, it is readily evident that means have been provided for selecting an information item and registering a report related thereto at a called station associated therewith via a telephone.

In view of the foregoing, it should be readily evident that there has been provided an improved interactive T.V./telephone transmission system.

What is claimed is:

1. An interactive purchasing system comprising a transmitting station providing a general transmission of signals adapted to be received by a plurality of television receivers at viewing stations via a given channel thereof, said signals representing information relating to associated merchandise, telephone coupling means at said viewing stations adapted to cooperate with a telephone in information transfer relation with respect to a selected one of a plurality of stores, means at each viewing station for indicating the selection of merchandise to be purchased, and means operable in response to indicating said selection serving to a request to purchase the selected merchandise, the last named means serving via said telephone to place a call to a store relating to the selected merchandise.

2. An interactive transmission system comprising a transmitting station providing a general transmission of signals adapted to be received via a given channel of television receivers disposed at viewing stations, telephone coupling means at said viewing stations adapted to cooperate with a telephone in placing a call via said telephone to a plurality of called stations, said signals including a plurality of information items each being respectively associated with a given one of the plurality of called stations, and means for indicating the selection of an information item and in response thereto registering via said telephone a report related to the selected information item at a called station associated with said information item.

3. An interactive transmission system comprising a transmitting station serving to transmit to a plurality of viewing stations a general transmission of signals containing groups of data therein adapted to be received via a geiven television receiver channel, said viewing station including telephone coupling means adapted to cooperate with a telephone in calling a plurality of called stations, means for indicating the selection of one of said groups of data for transmitting information related thereto to a called station associated therewith, and means responsive to the last named means for generating telephone dialing signals to be fed to said coupling means for transmitting information related to said selection to a called station.

4. An interactive purchasing system according to claim 3, in which said viewing stations comprise means for receiving a continuous transmission of signals containing said groups of data therein adapted to be coupled to a television receiver, means for selectively acquiring and storing a portion of said data, means operative in response to selection of one of said portions of data for generating telephone calling signals associated with said one portion of said data to be applied to said coupling means for calling a station associated with said selected portion of said data.

5. A viewing terminal comprising means for receiving a continuous general transmission of signals containing groups of data therein adapted to be coupled to a television receiver, means for selectively acquiring and recording a portion of said data, telephone coupling means adapted to receive portions of a telephone for transmitting information representative of said portion of said data via said telephone, means coupled to the second named means for generating telephone calling signals associated with each said portion of said data, and means for applying said calling signals to said telephone via said coupling means to call a station related to said selected portion of said data.

6. In an interactive transmission system having a transmitting station providing a general transmission of groups of data adapted to be received by a plurality of receiving stations via a given channel thereof, the viewing stations including means for selecting and calling the telephone of a station associated with each selected group of data and providing a report thereto. the called station comprising telephone means for receiving such calls, means responsive to receipt of such calls for providing an audible synthesized acknowledgment thereof. and means responsive to receipt of such calls for printing an acknowledgment thereof.

* * * * *